United States Patent
Zhang et al.

(10) Patent No.: US 11,057,814 B2
(45) Date of Patent: *Jul. 6, 2021

(54) SEAMLESS MOBILITY FOR 5G AND LTE SYSTEMS AND DEVICES

(71) Applicant: Apple Inc., Cupertino, CA (US)

(72) Inventors: Yujian Zhang, Beijing (CN); Mo-Han Fong, Sunnyvale, CA (US); Pingping Zong, Randolph, NJ (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,651

(22) Filed: Sep. 26, 2019

(65) Prior Publication Data

US 2020/0128464 A1 Apr. 23, 2020

Related U.S. Application Data

(63) Continuation of application No. 15/569,505, filed as application No. PCT/US2015/052392 on Sep. 25, 2015, now Pat. No. 10,462,723.

(Continued)

(51) Int. Cl.
*H04L 12/24* (2006.01)
*H04L 5/14* (2006.01)
(Continued)

(52) U.S. Cl.
CPC ....... *H04W 36/18* (2013.01); *H04W 36/0022* (2013.01); *H04W 36/0027* (2013.01);
(Continued)

(58) Field of Classification Search
CPC .......... H04W 36/18; H04W 36/0022; H04W 36/0027; H04W 36/0055; H04W 36/08; H04W 85/045; H04W 36/04
See application file for complete search history.

(56) References Cited

U.S. PATENT DOCUMENTS 10,148,369 B2 * 12/2018 Ng ................. H04L 5/005
2008/0188224 A1 8/2008 Pani et al.
(Continued)

FOREIGN PATENT DOCUMENTS

WO 2014182911 A1 11/2014
WO 2015009075 A1 1/2015

OTHER PUBLICATIONS

Communication pursuant to Article 94(3) EPC in European Patent Application No. 15894492.6 dated Aug. 17, 2020, 8 pgs.

(Continued)

*Primary Examiner* — Faruk Hamza
*Assistant Examiner* — Abusayeed M Haque
(74) *Attorney, Agent, or Firm* — Kowert, Hood, Munyon, Rankin & Goetzel, P.C.

(57) ABSTRACT

User equipment (UE), an enhanced NodeB (eNB) and method of reducing handover latency are generally described. The UE may transmit measurement feedback to the eNB based on control signals. The UE may receive a reconfiguration message from the eNB or another eNB to the UE is attached. The reconfiguration message may contain reconfiguration information indicating whether or not a physical layer or layer 2 of the UE is to be reconfigured and/or a security key is to be updated. The reconfiguration information may be dependent on whether the handover is between eNBs controlled by a same entity and/or whether the handover comprises an intra-frequency transition. The UE or eNB may initiate handover of the UE. During handover the UE may avoid physical layer or layer 2 reconfiguration or the security key update. The security key and data for the UE may be provided directly between the eNBs.

20 Claims, 8 Drawing Sheets

Related U.S. Application Data

(60) Provisional application No. 62/168,245, filed on May 29, 2015.

(51) Int. Cl.
| | |
|---|---|
| *H04W 84/18* | (2009.01) |
| *H04W 36/18* | (2009.01) |
| *H04W 36/08* | (2009.01) |
| *H04W 36/00* | (2009.01) |
| *H04W 36/30* | (2009.01) |
| *H04W 36/38* | (2009.01) |
| *H04W 84/04* | (2009.01) |
| *H04W 36/32* | (2009.01) |

(52) U.S. Cl.
CPC ....... *H04W 36/0055* (2013.01); *H04W 36/08* (2013.01); *H04W 36/30* (2013.01); *H04W 36/38* (2013.01); H04W 36/0069 (2018.08); *H04W 36/32* (2013.01); *H04W 84/045* (2013.01)

(56) References Cited

U.S. PATENT DOCUMENTS

| | | | |
|---|---|---|---|
| 2009/0073933 A1* | 3/2009 | Madour | H04W 12/062 370/331 |
| 2010/0172500 A1* | 7/2010 | Wu | H04W 12/041 380/272 |
| 2010/0267386 A1* | 10/2010 | Lim | H04W 36/385 455/436 |
| 2012/0172044 A1 | 7/2012 | Wu | |
| 2012/0202478 A1* | 8/2012 | Van Lieshout | H04W 36/0055 455/419 |
| 2013/0058245 A1* | 3/2013 | Van Lieshout | H04W 36/0083 370/252 |
| 2013/0142140 A1 | 6/2013 | Tseng et al. | |
| 2013/0288741 A1* | 10/2013 | Sjadieh | H04W 88/06 455/552.1 |
| 2014/0198701 A1* | 7/2014 | Ostergaard | H04W 76/20 370/311 |
| 2014/0220974 A1 | 8/2014 | Hsu | |
| 2014/0241320 A1 | 8/2014 | Wu et al. | |
| 2014/0369315 A1* | 12/2014 | Norrman | H04L 63/205 370/331 |
| 2015/0117183 A1 | 4/2015 | Heo et al. | |
| 2015/0223127 A1* | 8/2015 | Godin | H04W 36/30 370/331 |
| 2015/0237516 A1* | 8/2015 | Michel | H04W 24/02 370/252 |
| 2015/0245228 A1* | 8/2015 | Uchino | H04W 80/02 370/216 |
| 2015/0257160 A1* | 9/2015 | Ishida | H04W 72/0486 455/452.1 |
| 2015/0327159 A1 | 11/2015 | Gude et al. | |
| 2016/0050582 A1 | 2/2016 | Kruys et al. | |
| 2016/0050589 A1* | 2/2016 | Safavi | H04B 17/318 455/436 |
| 2016/0143003 A1* | 5/2016 | Yl | H04W 76/19 370/329 |
| 2016/0192376 A1* | 6/2016 | Lee | H04W 72/0406 370/252 |
| 2016/0212661 A1* | 7/2016 | Basu | H04L 1/1614 |
| 2016/0219475 A1* | 7/2016 | Kim | H05K 999/99 |
| 2016/0242064 A1* | 8/2016 | Lee | H04W 24/10 |
| 2016/0249264 A1* | 8/2016 | Axen | H04W 36/04 |
| 2016/0366175 A1* | 12/2016 | Basu | H04L 63/1441 |
| 2017/0013575 A1* | 1/2017 | Jung | H04L 47/29 |
| 2017/0034865 A1* | 2/2017 | Jung | H04W 76/18 |
| 2017/0164281 A1* | 6/2017 | Chiba | H04W 72/0446 |
| 2017/0231026 A1* | 8/2017 | Vesterinen | H04W 36/0069 |
| 2017/0373728 A1* | 12/2017 | Viering | H04B 7/0632 |

OTHER PUBLICATIONS

International Application Serial No. PCT/US2015/052392, International Preliminary Report on Patentability dated Dec. 14, 2017, 6 pgs.

International Application Serial No. PCT/US2015/052392, International Search Report dated Apr. 22, 2016, 7 pgs.

International Application Serial No. PCT/US2015/052392, Written Opinion dated Apr. 22, 2016, 4 pgs.

European Application Serial No. 15894492.6, Extended European Search Report dated Oct. 16, 2018, 17 pgs.

Kyocera, Corp, "Support of inter-MeNB handover without SeNB change", 3GPP Draft; RJ-150287 3GPP, Mobile Competence Centre; 650; F-06921 France TSG RAN WG3 Meeting #87 Athens, Greece, {Feb. 8, 2015).

* cited by examiner

```
-- ASN1START

MobilityControlInfo ::=    SEQUENCE{
    targetPhysCellId        PhysCellId,
    carrierFreq             CarrierFreqEUTRA
    HO-toEUTRA2
    carrierBandwidth        HO-   CarrierBandwidthEUTRA
    toEUTRA
    additionalSpectrumEmission   additionalSpectrumEmission
    HO-toEUTRA t304         ENUMERATED{
                            ms50,ms100,ms150,ms200,ms500,ms1000, ms2000,spare1},
    newUE-Identity          C-RNTI,
    radioResourceConfigCommon  rach-  RadioResourceConfigCommon,
    ConfigDedicated         RACH-ConfigDedicated                 OPTIONAL,  --Need
    OP
    [[ carrierFreq-v9e0     CarrierFreqEUTRA-v9e0                OPTIONAL,  --Need
    ON
    ]],
    [[ drb-ContinueROHC-r11     ENUMERATED{true}                 OPTIONAL,  --Cond
    HO
    ]],
    [[ rach-Skip-r14            ENUMERATED{true}       OPTIONAL,  --Need ON
    layer2-ReconfigSkip-r14     ENUMERATED{true}       OPTIONAL,  --Need ON ENUMERATED{true}
    keyUpdateSkip-r14                                  OPTIONAL,  --Need ON
    ]]                                                                          } 602
}

-- ASN1STOP
```

FIG. 6A

```
-- ASN1START
MobilityControlInfoSCG-r12 ::=      SEQUENCE {
    ue-IdentitySCG-r12
    SCGEst                          ENUMERATED {
                                        ms50, ms100, ms150, ms200, ms500, ms1000, ms2000, spare1},
    rach-ConfigDedicated-r12        C-RNTI,
    cipheringAlgorithmSCG-r12       RACH-ConfigDedicated
                                    CipheringAlgorithm-r12                      OPTIONAL,   -- Cond
                                                                                OPTIONAL,   -- Need OP
                                                                    OPTIONAL,   -- Need ON
    [[  rach-Skip-r14               ENUMERATED{ture}
        layer2-ReconfigSkip-r14     ENUMERATED{ture}                OPTIONAL,   -- Need ON
        keyUpdateSkip-r14           ENUMERATED{ture}                OPTIONAL,   -- Need ON OPTIONAL -
    ]]                                                                          -- Need ON
}
-- ASN1STOP
```

SEAMLESS MOBILITY FOR 5G AND LTE SYSTEMS AND DEVICES

PRIORITY CLAIM

This application is a continuation of U.S. patent application Ser. No. 15/569,505, filed Oct. 26, 2017, which is a U.S. National Stage Filing under 35 U.S.C. 371 from International Application No. PCT/US2015/052392, filed Sep. 25, 2015 and published in English as WO 2016/195735 on Dec. 8, 2016, which claims the benefit of priority to U.S. Provisional Patent Application Ser. No. 62/168,245, filed May 29, 2015, and entitled "SEAMLESS MOBILITY FOR 5G AND LTE SYSTEMS," each of which is incorporated herein by reference in its entirety.

TECHNICAL FIELD

Embodiments pertain to radio access networks. Some embodiments relate to device mobility in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of personal communication devices has increased astronomically over the last two decades. The penetration of mobile devices (user equipment or UEs) in modern society has continued to drive demand for a wide variety of networked devices in a number of disparate environments. The use of networked UEs using 3GPP LTE systems has increased in all areas of home and work life. One concern with UEs is latency involved in handovers (or cell reselection) between different base stations (enhanced eNode-Bs or eNBs). Handovers may occur as a UE moves in a geographical location served by multiple eNBs and a determination is made to change the eNB providing communication services to the UE from the current eNB to another eNB. Due to the number of processes involved, the handover may take on the order of about 30-50 ms, which is a substantial amount of time. The handover latency may, in certain circumstances, result in a period of relatively poor quality service or even loss of service during the handover and may at present be excessive for 5G systems, for which handover latency is not to exceed about 1 ms.

It may thus be desirable for upcoming 5G, as well as 4G systems, to reduce handover latency and thus produce seamless mobility for UEs.

BRIEF DESCRIPTION OF THE FIGURES

In the figures, which are not necessarily drawn to scale, like to numerals may describe similar components in different views. Like numerals having different letter suffixes may represent different instances of similar components. The figures illustrate generally, by way of example, but not by way of limitation, various embodiments discussed in the present document.

FIGS. 6A and 6B respectively illustrate IE mobilityControlInfo and mobilityControlInfoSCG ASN.1 code in accordance with some embodiments.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
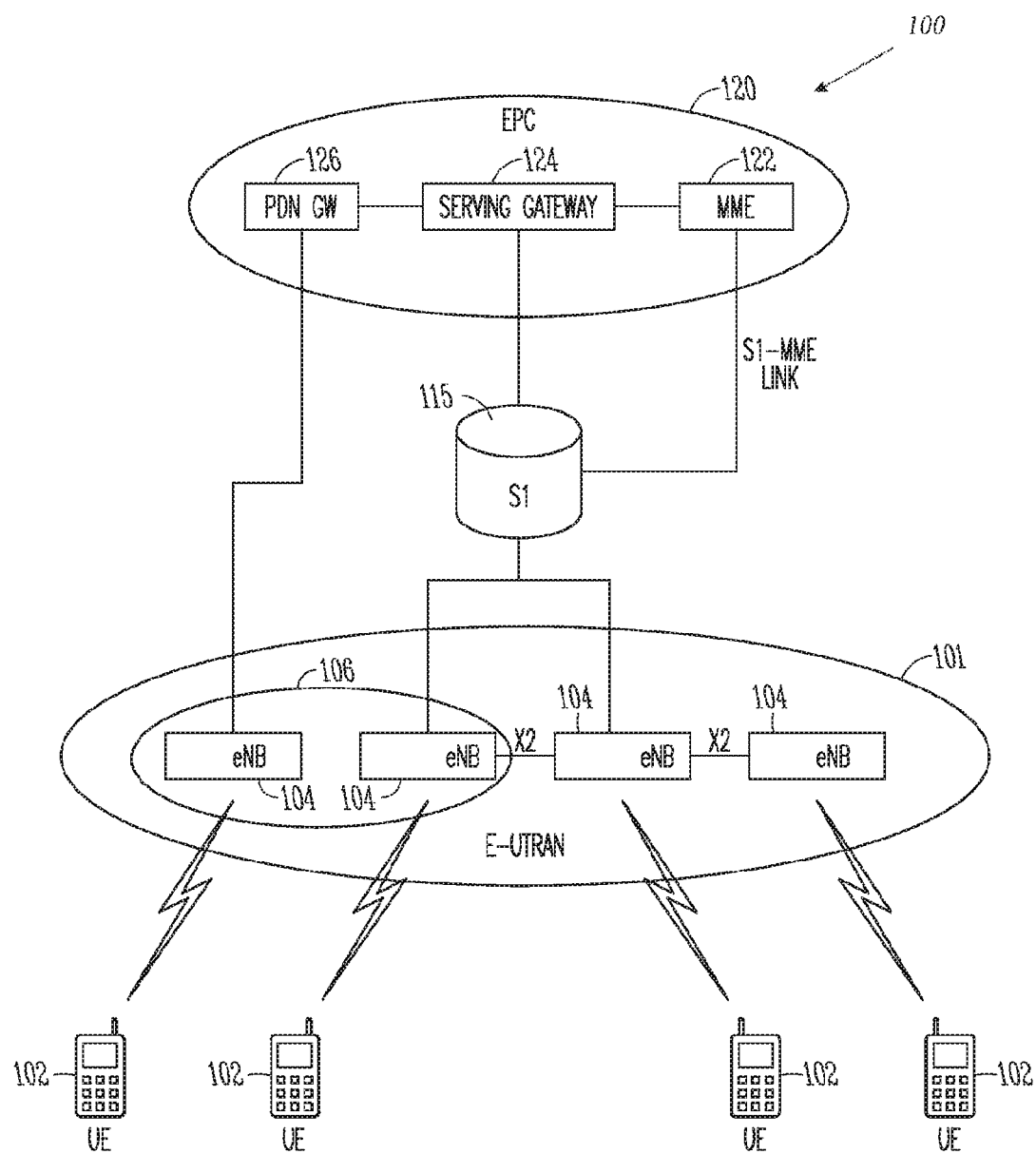
FIG. 1 is a functional diagram of a 3GPP network in accordance with some embodiments.

FIG. 1 shows an example of a portion of an end-to-end network architecture of a Long Term Evolution (LTE) network with various components of the network in accordance with some embodiments. As used herein, LTE and LTE-A networks and devices are referred to merely as LTE networks and devices. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN includes enhanced node Bs (eNBs) 104 (which may operate as base stations) for communicating with user equipment (UE) 102. The eNBs 104 may include macro eNBs and low power (LP) eNBs.

The MME 122 may be similar in function to the control plane of legacy Serving GPRS Support Nodes (SGSN). The MME may manage mobility aspects in access such as gateway selection and tracking area list management. The serving GW 124 may terminate the interface toward the RAN 101, and route data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may be a key node for policy enforcement and charging data collection. The PDN GW 126 may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) may terminate the air interface protocol and may be the first point of contact for a UE 102. At least some of the eNBs 104 may be in a cell 106, in which the eNBs 104 of the cell 106 may be controlled by the same processor or set of processors. In some embodiments, an eNB 104 may be in a single cell 106, while in other embodiments the eNB 104 may be a member of multiple cells 106. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal frequency-division multiplexing (OFDM) communication signals with an eNB 104 over a multicarrier communication channel in accordance with an OFDMA communication technique. The OFDM signals may comprise a plurality of orthogonal subcarriers. Each of the eNBs 104 may be able to transmit a reconfiguration message to each UE 102 that is connected to that eNB 104. The reconfiguration message may contain reconfiguration information including one or more parameters that indicate specifics about reconfiguration of the UE 102 upon a mobility scenario (e.g., handover) to reduce the latency involved in the handover. The parameters may include physical layer and layer 2 reconfiguration indicators, and a security key update indicator. The parameters may be used to instruct the UE 102 to avoid or skip one or more of the processes indicated to decrease messaging between the UE 102 and the network. The network may be able to automatically route packet data between the UE 102 and the new eNB 104 and may be able to provide the desired information between the eNBs 104 involved in the mobility. The application, however, is not limited to this, however, and additional embodiments are described in more detail below.

The S1 interface 115 is the interface that separates the RAN 101 and the EPC 120. The S1 interface 115 may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be used to extend coverage to indoor areas where outdoor signals do not reach well, or to add network capacity in areas with very dense phone usage, such as train stations. As used herein, the term low power (LP) eNB may refer to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to the user's broadband line. Once plugged in, the femtocell may connect to the mobile operator's mobile network and provide extra coverage in a range of typically 30 to 50 meters for residential femtocells. Thus, an LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Other wireless communication devices may be present in the same geographical region as the RAN 101. As shown in FIG. 1, WLAN devices including one or more access points (APs) 103 and one or more stations (STAs) 105 in communication with the AP 103. The WLAN devices may communicate using one or more IEEE 802.11 protocols, such as IEEE 802.11a/b/n/ac protocols. As the power of the WLAN devices 103, 105 may be fairly limited, compared with the eNBs 104, the WLAN devices 103, 105 may be geographically localized.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and may be frequency (full-duplex) or time (half-duplex) separated. In Time Division Duplexed (TDD), the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and may be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
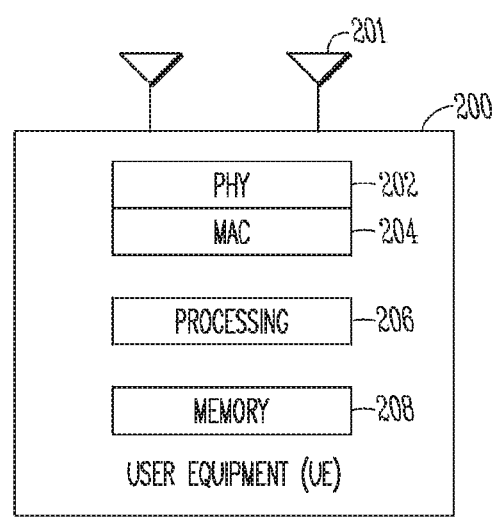
FIG. 2 is a block diagram of a 3GPP device in accordance with some embodiments.

FIG. 2 is a functional diagram of a 3GPP device in accordance with some embodiments. The device may be a UE or eNB, for example, such as the UE or eNB shown in FIG. 1 that may be configured to reduce the handover latency in mobility scenarios as described herein. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206, such as one or more single-core or multi-core processors, and memory 208 arranged to perform the operations described herein. The physical layer circuitry 202, MAC circuitry 204 and processing circuitry 206 may handle various radio control functions that enable communication with one or more radio networks compatible with one or more radio technologies. The radio control functions may include signal modulation, encoding, decoding, radio frequency shifting, etc. For example, in some embodiments, communication may be enabled with one or more wireless metropolitan area networks (WMAN), a wireless local area network (WLAN), and a wireless personal area network (WPAN). In some embodiments, the device can be configured to operate in accordance with 3GPP standards or other protocols or standards, including Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the device 200 may include one or more user interfaces designed to enable user interaction with the system and/or peripheral component interfaces designed to enable peripheral component interaction with the system. For example, the device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software. In some embodiments, some of the elements described in FIG. 2 may be omitted or additional elements may be provided. The device shown and described herein is thus not limited to the embodiment shown in FIG. 2.

As above, handovers may occur in communication networks, such as that shown in FIG. 1 when the eNB 104 serving the UE 102 (the eNB 104 also referred to herein as the serving or source eNB 104, cell or transmission point (TP)) determines that a different eNB 104 (also referred to herein as the target eNB) is to serve the UE 102 rather than the source eNB 104. The handover may be either intra-network between eNBs 104 in a single network or inter-network between eNBs 104 in different networks. Independent of whether the handover is intra- or inter-network, however, the handover process may take a number of operations and it may overall take a significant amount of time to complete the operations involved in the handover process. These operations may include, for example, the UE 102 first measuring signal and/or channel qualities and transmitting the qualities to the serving eNB 104. The qualities measured may include, for example, signal-to-noise ratio measurements (SINR), signal-to-interference ratio measurements (SIR), error rate, etc. . . . . . The eNB 104 may then determine whether to perform the handover based on a comparison between the qualities and send allocation and reconfiguration information to the UE 102. The UE 102 may subsequently detach from the source eNB 104 and synchronize to the target eNB 104. The target eNB 104 may, upon receiving synchronization information from the UE 102, transmit allocation and timing information to the UE 102 and receive confirmation from the UE 102 that the reconfiguration is complete prior to the UE 102 sending data to the target eNB 104. Thus, identification, address, channel, signal strength, security, Quality of Service (QoS) and other information may be communicated from the UE 102 to the source and/or target eNB 104 to enable the target eNB 104 to select the appropriate channel to use in communications with the UE 102. After the information is communicated, a communication link between the UE 102 and target eNB 104 may be established and subsequently, the existing communication link between the UE 102 and the source eNB 104 may be torn down.

Thus, several internal and external operations may be performed by the UE 102 and several other internal and external operations may be performed by the source eNB 104, each of which may be interdependent and thus take substantial amount of time to complete. Latency for mobile UEs 102 moving quickly (relative to the geographic communication area of the eNB) during any type of handover may present difficulties. In particular, as handover may occur at or near boundaries between the source and target eNBs 104, while the decision-making process and actual handover is occurring, the UE 102 may move out of range (or nearly out of range) of the source eNB 104 and before the communication link with the target eNB 104 can be established. This may result in poor quality communications or in a loss of service entirely until handover is completed. It may be desirable to avoid such issues by reducing the latency involved in the handover process.

The handover process, as well as the modes and states in which the UE 102 may be in, may depend on the type of network. In LTE networks, for example, the UE 102 may be in a Radio Resource Control (RRC) connected mode in which user data is being actively communicated between the UE 102 and eNB 104 or in an RRC idle mode in which the UE 102 monitors various paging and control channels, takes channel measurements and provides feedback to the eNB 104 but user data is not being actively communicated between the UE 102 and eNB; similarly in UMTS networks, the RRC connected states may include a cell dedicated channel (Cell_DCH) state, a cell paging channel (CELL PCH) state, a Universal Terrestrial Radio Access Network (UTRAN) Registration Area (URA) paging channel (URA_PCH) state or a forward access channel (CELL_FACH) state. To control the modes of the UE 102, the eNBs 104 and elements of the RAN or core network may have various timers associated with the UE 102. These timers may control state changes for the UE 102. One or more inactivity timers may be used by the eNB 104 to determine the time from the last UE 102 activity and consequently indicate to the UE 102 to transition between one or more RRC connected states, as well as between an RRC connected state and an RRC idle state. In the RRC idle state, the network may release the UE 102 to idle mode, in which there is no RRC connection established between the UE 102 and any eNB 104, while the MME in the core network retains information about the tracking area in which the UE 102 is registered. Handover may occur when the UE 102 is in RRC idle mode.

Once the UE 102 determines that it is to enter RRC Connection mode from RRC Idle mode, e.g., by being activated by a user or paged by the serving eNB 104, a series of control messages may be exchanged between the UE 102 and the eNB 104 prior to any user data being transmitted between the UE 102 and the eNB 104. For LTE systems, a Non-Access Stratum (NAS) message (RRC Connection Request) may be used to initiate the RRC connection process. The eNB 104 may respond with a RRC Connection Setup message to the UE 102. The UE 102 may then transmit a RRC Connection Setup Complete to the eNB 104. For UMTS, the RRC connection process involves further control communications between the UE 102 and eNB 104.

The control messages and connections might be slightly more complicated when the UE 102 employs Carrier Aggregation (CA), which originated in LTE Release-10. CA may be used to enhance throughput and data rate when the UE 102 is in the RRC Connection mode. In CA, multiple Component Carriers (CCs) in different frequency bands may be aggregated to support wider transmission bandwidth (up to 100 MHz), permitting the UE 102 to simultaneously receive and/or transmit on multiple CCs corresponding to multiple different serving cells. At RRC connection (re) establishment or handover, one of the serving cells may source NAS information and security for the UE 102. This serving cell is referred to as the primary serving cell (PCell), and other cells are referred to as the secondary serving cells (SCells). As the PCell may operate on a primary frequency, each SCell may thus operate on a secondary frequency, which may be configured once an RRC connection is established and which may be used to provide additional radio resources.

Handover may be used when the UE 102 switches between PCells (whether or not CA is used). From the UE 102 perspective, handover may involve both physical layer and Layer 2 (Packet Data Convergence Protocol (PDCP)/ Radio Link Control (RLC)/Media Access Control (MAC)) reconfiguration, therefore an explicit RRC reconfiguration may be used. The RRC reconfiguration may be accomplished via RRC signaling, in particular using an RRCConnectionReconfiguration message containing mobilityControlInfo. Physical layer reconfiguration may include both uplink (UL) and downlink (DL) synchronization and changes of physical layer-related configurations. The UL and DL synchronization may occur via a random access procedure. Layer 2 reconfiguration may include a reset of the MAC layer, re-establishment and reconfiguration of PDCP and RLC for all bearers, and a change of security key for the UE 102. From network side, the main information exchanged between source and target eNBs 104 may be data forwarding in the PDCP layer in addition to the configuration exchange.

3GPP Rel-12 introduced the concept of dual connectivity, in to which the bearer may be split among multiple eNBs 104. In particular, in dual connectivity situations, the UE 102 may connect to both a Master eNB 104 (MeNB) and a Secondary eNB 104 (SeNB) while in the RRC Connected mode and consume resources provided by both eNBs 104. The MeNB may terminate the S1-MME and thus act as a mobility anchor towards the core network. When the UE 102 moves between SeNBs (from a source SeNB to a target SeNB), a secondary cell group (SCG) change procedure may be used. An SCG may be a group of serving cells associated with a SeNB. Physical layer and Layer 2 reconfiguration may be used during the SCG change procedure. As above, physical layer reconfiguration for the target SeNB may include UL and DL synchronization, among changes of other physical layer related configurations. Layer 2 reconfiguration may include a reset of the SCG MAC information, re-establishment of the SCG RLC for split bearers, a change of the UE 102 security key for SCG bearers, and PDCP data recovery.

Both handover and the SCG Change procedure may result in a service interruption as the UE 102 may stop using the previous configuration and instead apply the new configuration. It is thus desirable to minimize or eliminate Physical layer, Layer 2 and Layer 3 reconfiguration to avoid explicit RRC reconfiguration and achieve zero or almost zero service interruption time during mobility. In situations in which the service interruption time is minimized, the impact to Quality of Experience (QoE) due to mobility may be minimized and ultra-low latency requirements (e.g. less than 1 ms latency) of 5G networks may be able to be satisfied.

In some embodiments, the latency of handover effected between eNBs 104 that are controlled by the same entity (e.g., controlled by the same processor or group of processors) may be minimized as the eNB 104 may be connected with ideal backhaul and controlled by the same pool of processors. For such cells, the state of a particular UE 102 may be shared without standardized message exchanges. The UE 102 states shared may include both Physical layer and Layer 2 or RRC state variables and buffers. One example is CA scenario #4, in which small cells are overlaid in hot spots of the macro cells and use a different frequency band than that of the macro cells. In this example, the macro and small cells may be connected with ideal backhaul, e.g., via a Common Public Radio Interface (CPRI)). In dual connectivity embodiments, the macro and small cells, on the other hand may not be controlled by the same entity. As indicated below, latency during an SCG change may be increased for dual connectivity relative to the handover latency for eNBs 104 operated by the same entity.

In some embodiments, at least one of Physical and Layer 2 reconfiguration may be avoided entirely during handover. Physical layer synchronization, in which the UL timing to the source and target eNB 104 may be close, may be reduced to, e.g., within several microseconds. A Layer 2 context may be shared directly between source and target eNB 104 without communication from the UE 102 to either the source or target eNB 104 in circumstances in which the source and target TPs are controlled by the same entity. In embodiments in which the source and target TPs are not controlled by the same entity, the Layer 2 status transfer can be used to forward layer 2 status from the source TP to target TP.

As above, in some embodiments when handover is effected, security keys may be exchanged between the UE 102 and the target eNB 104. In particular, for security reasons, security key update may be used when moving between eNBs 104 controlled by different entities and the security key is actually processed by the target eNB 104. For example, in LTE Rel-12 dual connectivity, when a SCG bearer is used, the SeNB may use a security key to encrypt/decrypt data for the SCG bearer. Thus, when performing an SCG change between SeNBs, security key for SCG bearers are updated. However, when a split bearer in dual connectivity embodiments is used, the PDCP layer may be handled by the MeNB; the SeNB may not process the security key. Therefore, in such embodiments, when performing an SCG change between SeNBs, update of the security key may be avoided. Thus, in embodiments in which the source and target eNBs 104 are controlled by the same entity, a security key update between the UE 102 and the target eNB 104 may be avoided as the source and target eNB 104 may share the security key information of the UE 102 directly between themselves. In some embodiments, exchange of the security key information between the UE 102 and target eNB 104 may occur after the communication link has been established between the UE 102 and target eNB 104, e.g., as a confirmation or later update.

Moreover, the same Physical layer and Layer 2 configuration may be used by the UE 102 in communicating between the source and target eNBs 104. This may further minimize reconfiguration time in addition to sharing the Layer 2 context between the source and target eNB 104, as well as permitting the security key to remain un-updated. The Physical layer and Layer 2 configuration may include both a common configuration (transmitted as system information) and a dedicated configuration (i.e., UE 102 specific).

Figure 3:
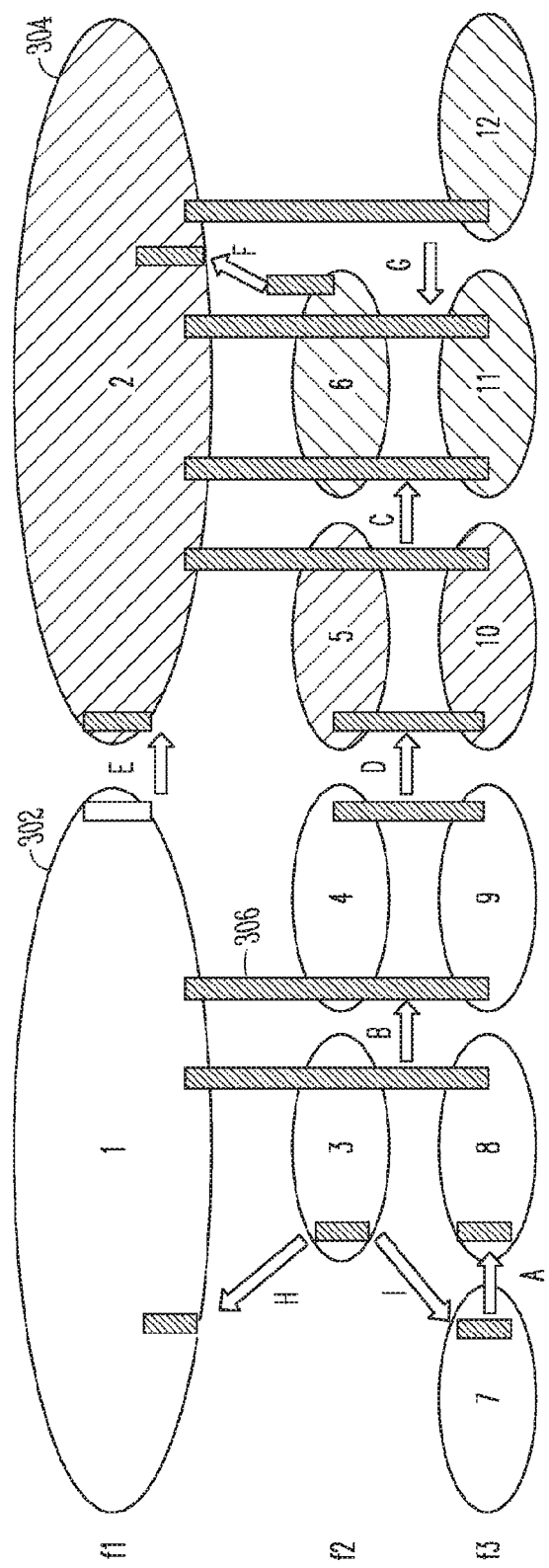
FIG. 3 illustrates different mobility scenarios in accordance with some embodiments.

FIG. 3 illustrates different mobility scenarios in accordance with some embodiments. In some embodiments, the cells 1-12 shown in FIG. 3 may be shown in FIG. 1 (only one cell 106 of which is shown, although more can exist) and the bars 306 may indicate the UEs 102 shown in FIG. 1. As shown, the UE 306 may, in various scenarios, be connected to one or more of the cells, such as cell 302 or cell 304. Each connection to a different cell 1-12 may be via a different frequency, each of which may be in a different frequency band in some embodiments. In one example, as shown in FIG. 3, three frequencies f1, f2, and f3 may be deployed and the UE 306 may connect to one or more of 12 cells, shown as cell 1-12 using these frequencies. Some of the cells may be controlled by one entity and others may be controlled by a different entity. For example, cell 1 302, 3, 4, 7, 8 and 9 may be controlled by a first entity, while cell 2 304, 5 and 10 may be controlled by a second entity. Each bar may indicate the aggregated frequencies for a particular UE. Different mobility scenarios are shown in FIG. 3.

Scenario A may be an intra-frequency mobility scenario. In this scenario, the UE may transition from source cell 7 to target cell 8. Both the source and target cells may be controlled by the same entity. In this case, the latency of the handover may be minimized as all of the mobility-related communications to set up the handover, which involves a single frequency (f3), other than the measurements used to determine whether handover is to occur may be avoided.

Scenario B may be an intra-frequency mobility scenario in which anchor-booster aggregation is used. As shown, cell 1 302 may be the anchor cell, and cells 3, 8, 4, and 9 may be the booster cells. The aggregation may be similar to LTE carrier aggregation. In Scenario B, the anchor cell 1 302 may not change during handover, while booster cell 3 and cell 8 may respectively switch to cell 4 and cell 9. Booster cell 3, cell 4, cell 8 and cell 9, as above, may be controlled by the same entity in Scenario B. In this scenario, multiple cells are used by the UE, with each frequency being associated with a different cell, and all of the cells are controlled with the same entity.

Scenario C is similar to Scenario B in the sense that anchor-booster aggregation is used, with cell 1 302 as the anchor and cell 5, cell 10, cell 6, and cell 11 as booster cells. The aggregation is similar to LTE dual connectivity. In Scenario C, the anchor cell 2 304 may again not change during handover, while booster cell 5 and cell 10 may respectively be switched to cell 6 and cell 11. As shown, the controlling entity of booster cell 5 and cell 10 may be different from the controlling entity of booster cell 6 and cell 11. In this scenario, multiple cells are used by the UE, with each frequency being associated with a different cell, and only some of the cells are controlled with the same entity.

Both Scenario D and E are mobility scenarios between cells controlled by different entities. In scenario D, multiple cells each using a different frequency may be involved. Specifically, cell 4 and cell 9 may respectively be switched to cell 5 and cell 10. In scenario E, a single cell may be involved; cell 1 302 may be switched to cell 2 304. No anchor cell is present in either scenario D or scenario E.

Scenarios A-E are intra-frequency scenarios in which the UE may communicate with the source and target cells using the same frequency. Both Scenarios H and I, on the other hand, include inter-frequency mobility scenarios in which the frequency (or frequencies) used by the cells involved in the transition changes. These changes may include using different frequencies within the same frequency band, using different frequencies in different frequency bands, or a combination in which some different frequencies are within the same frequency band and others are in different frequency bands. In embodiments in which multiple frequencies are used, all of the frequencies may differ or some but not all of the frequencies may be different cells. Specifically, in scenario H, the UE transitions from source cell 3, which uses frequency f2 to target cell 1, which uses frequency f1. In scenario I, the UE transitions from source cell 3, which uses frequency f2 to target cell 7, which uses frequency f3. As shown, cell 1, 3, 7 are all controlled by the same entity.

Scenario F is also inter-frequency mobility scenario. Specifically, in scenario F, the UE transitions from source cell 6, which uses frequency f2 to target cell 2, which uses frequency f1. Unlike scenarios H and I, however, in scenario F, the UE moves between cells controlled by different entities.

Scenario G is an intra-frequency scenario in which the source and target cells all use the same frequency. As shown, the UE transitions from source cell 12, which uses frequency f3 to target cell 11, which also uses frequency f2. The UE also contains an anchor cell, cell 2 304, which is controlled by a different entity than either source cell 12 or target cell 11. In addition, in scenario G, the anchor is boosted by the addition of another cell during the transition. Specifically, an additional cell, cell 6 may be added during the transition. The added cell 6 may be controlled by the same entity as either anchor cell 2 304 or cell 11 or 12, or may be controlled by a different entity than either anchor cell 2 304 or cell 11 or 12. The added cell 6 may use a different frequency than either anchor cell 2 304 or cell 11 or 12.

Figure 4:
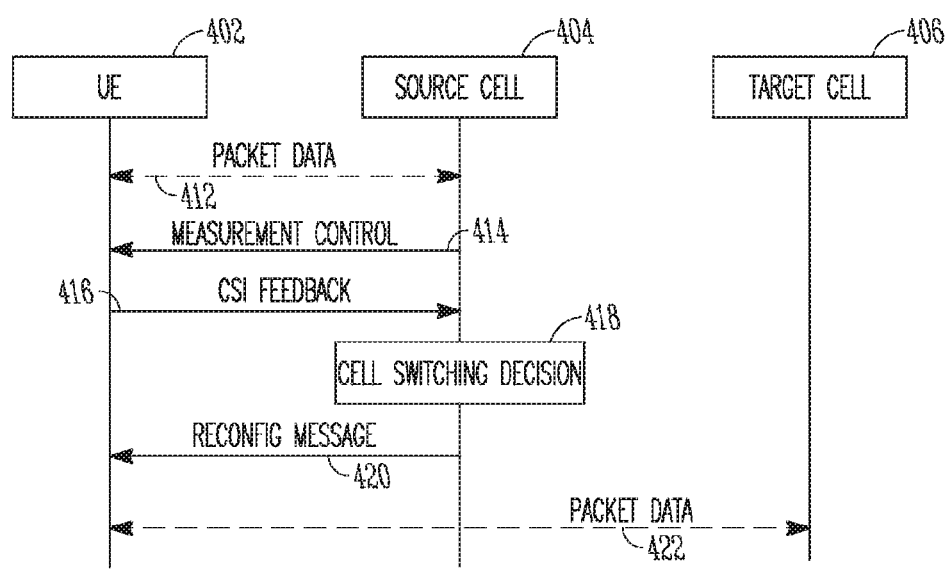
FIG. 4 illustrates a signaling procedure for seamless mobility in accordance with some embodiments.
Figure 5:
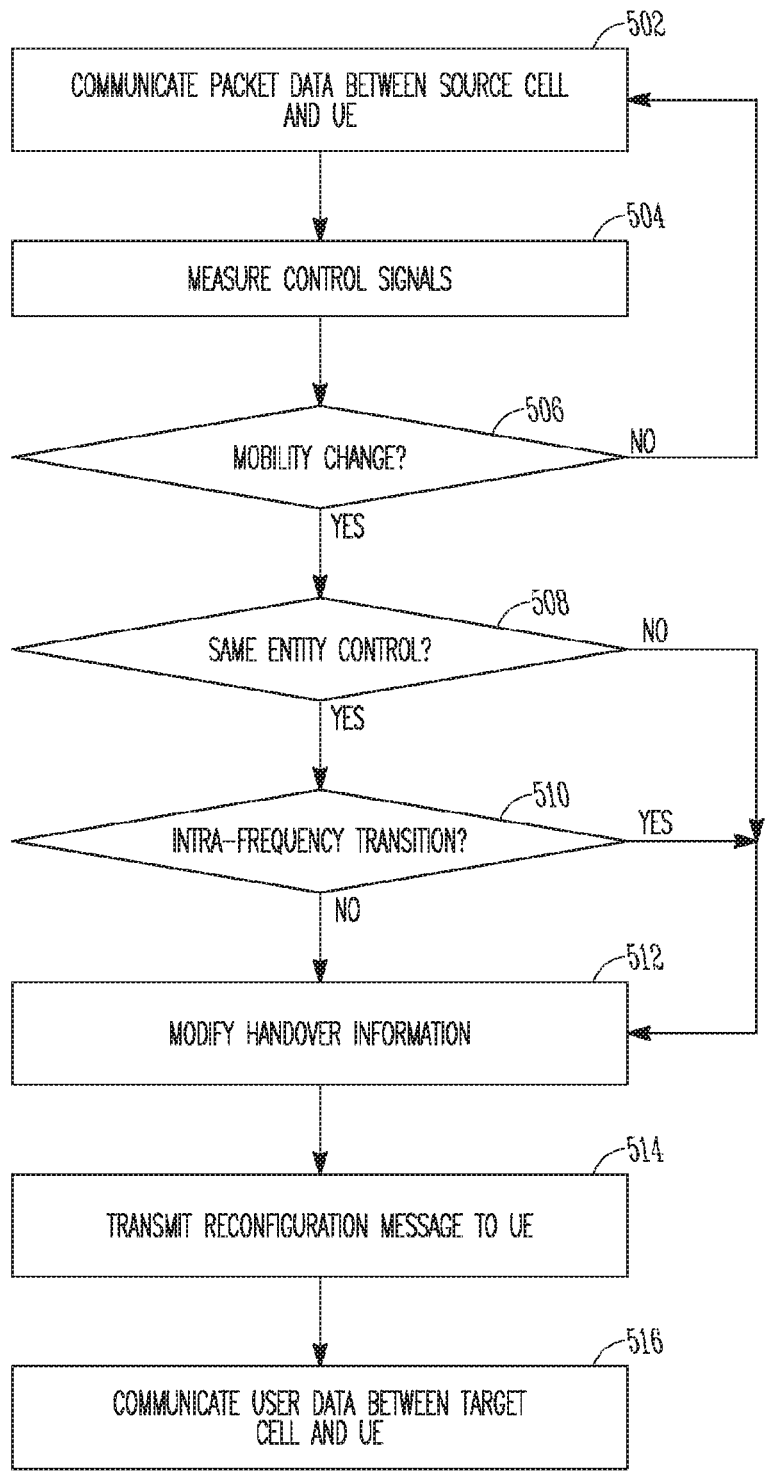
FIG. 5 illustrates a flowchart of UE mobility in accordance with some embodiments.

FIG. 4 illustrates a signaling procedure for seamless mobility in accordance with some embodiments. Specifically, FIG. 4 illustrates a signaling procedure for at least some of the scenarios shown in FIG. 3. In some embodiments, the source cell and target cells 404, 406 shown in FIG. 4 may be the cells 106 shown in FIG. 1 and the UE 402 may be the UE 102 shown in FIG. 1. Similarly, FIG. 5 illustrates a flowchart of UE mobility in accordance with some embodiments. The flowchart of FIG. 5 illustrates the signaling procedure of FIG. 4, along with other operations not shown. The method shown in FIGS. 4 and 5 may refer to UEs or cells operating in accordance with 3GPP standards, embodiments of those methods are not limited to just those UEs or cells and may also be practiced on other mobile devices, base stations, access points or wireless networks operating in accordance with any suitable wireless protocols, including 802.11. In some embodiments, the operations described may occur in a different order. In some embodiments, some of the operations described may be omitted or additional operations may be provided. The method shown and described herein is thus not limited to the embodiment shown in FIGS. 4 and 5.

As shown in FIGS. 4 and 5, the UE and source cell may initially exchange packet data 412 at operation 502. The packet data 412 may be user data, such as a voice-over-IP telephone call or other application data associated with the particular UE. The packet data 412 may be transmitted in either direction, from the UE 402 to the source cell 404 or from the source cell 404 to the UE 402.

The source cell 404 may transmit various control signals to the UE 402 from time to time. Among these control signals may be measurement control signals 414, Layer 3 (network) signaling. The source cell 404 may request that the UE 402 take measurements of the measurement control signals 414 at operation 504. Specifically, Channel State Information (CSI) measurements taken by the UE 402 may be used by the source cell 404 (or core network) to estimate the channel quality and determine whether handover is desired. CSI measurements may measure Cell-specific Reference Signals (CRS), CSI Reference Signals (CSI-RS) or other Channel State Information-Interference Measurement (CSI-IM) signals transmitted by the source cell 404 for measurement purposes.

From the measurements, calculations of the channel quality may be subsequently determined and reported to the source cell 404 by the UE 402 through CSI feedback 416. The CSI feedback 416 may include a Channel Quality Indicator (CQI) and may be sent from the UE 402 to the cell 404 to indicate, for example, a suitable downlink transmission data rate, i.e., a Modulation and Coding Scheme (MCS) value, for communications between the source cell 404 and the UE 402. The information provided by the CQI may include both channel quality and desired transport block size. The CQI may be, for example, a 4-bit integer (i.e., 15 different values) and may be based on an observed signal-to-interference-plus-noise ratio (SINR) at the UE 402. The CQI may take into account the UE 402 capability, such as the number of antennas and the type of receiver used for detection, which may be then used by the source cell 404 to select an optimum MCS level for DL scheduling and data transmission. The CSI and CQI may be reported either periodically or aperiodically. A periodic CQI report may be carried by using the PUCCH or, if the UE 402 is to send UL data in the same subframe as a scheduled periodic CQI report, the periodic CQI report may instead use the PUSCH. A periodic CQI report may be supplemented by an aperiodic CQI report, in particular if UL data is scheduled during the same subframe as a scheduled periodic CQI report.

In addition to the source cell 404 determining the appropriate characteristics to use for UL and DL transmissions associated with the UE 402, the CSI feedback 416 may be used by the source cell 404 to determine whether or not handover of the UE 402 is to occur at operation 506. If not, packet data may continue to be transmitted between the UE 402 and the source cell 404 at operation 502 until the next CSI feedback is received by the source cell 404. The switching decision 418 may be made by the source cell 404. The CSI feedback 416 may contain CSI information associated with other cells, including the target cell 406, or the source cell 404 may obtain CSI feedback information associated with the target cell 406 from the target cell 406, for example.

As shown in FIG. 4, based on the CSI feedback 416, the source cell 418 may determine at operation 506 it is appropriate to switch communication with the UE from the source cell 404 to the target cell 406. The source cell 404 may determine whether the source cell 404 and target cell 406 are controlled by the same entity or different entities at operation 508.

If at operation 508 the source cell 404 determines that the source cell 404 and target cell 406 are controlled by the same entity, the source cell 404 may determine at operation 510 whether an intra-frequency transition is to occur when the UE 402 is switched from the source cell 404 and target cell 406. That is, the source cell 404 may determine whether switching from the source cell 404 to the target cell 406 involves the UE 402 switching between different frequency bands. This may, for example, correspond to scenarios H and I in FIG. 3.

If at operation 510 the source cell 404 determines that no intra-frequency transition is to occur when the UE 402 is switched from the source cell 404 and target cell 406, the switching may be transparent to the UE 402. In such embodiments, the handover information may be provided directly between the source cell 404 and the target cell 406. Examples of these embodiments include, for example, scenario A, which is an example of a standalone deployment, or scenario B, which is an example of an anchor-booster deployment in which the source cell 404 and the target cell 406 may be represented as one of the boosters shown in FIG. 3. In some embodiments in which the source cell 404 and target cell 406 are coordinated by the same entity/processor, no message may be exchanged between the two as the entity is able to provide the UE information.

In other non-transparent (to the UE) embodiments, the source cell 404 may modify the handover information to be transmitted to the UE 402 at operation 512. In some embodiments, the source cell 404 may determine whether or not Physical Layer reconfiguration, including random access procedure to the target cell 406, Layer 2 reconfiguration, e.g. PDCP, RLC layer re-establishment and security key update are to be performed by the UE 402. In some embodiments, the source cell 404 may use a single bit to control all three processes performed by the UE 402. In some embodiments, the source cell 404 may individually control each process to be performed by the UE 402 using different bits. In some embodiments, the UE 402 may avoid reconfiguration—Physical Layer and Layer 2 reset/reconfiguration, entirely as well as further avoiding exchange of a new security key with the target cell 406. Substantial amounts of explicit control signaling and acknowledgements between the source cell 404 and the UE 402, and between the target cell 406 and the UE 402, may thus be avoided. Instead, at least some handover information, such as the security key, may be provided directly from the source cell 404 to the target cell 406.

The source cell 404 may send a reconfiguration message 420 to the UE 402 at operation 514. The reconfiguration message 420 may include the modified handover information indicating whether or not to reconfigure the Physical Layer or Layer 2 and/or update the security key determined at operation 512. The UE 402 may, whether a single bit or multiple bits are used to turn off various processes, follow the modified handover information to reduce communication between the UE 402 and both the source cell 404 and the target cell 406 by reducing handover reconfiguration. When at least some of the handover reconfiguration is turned off, the UE 402 may be able to speed up the processing time for mobility reconfiguration (e.g. handover or SCG Change), thereby reducing the service interruption time. This enhancement is applicable for both 5G and LTE systems.

As above, a number of control-based communications may be transmitted between the UE 402 and either the source cell 404 or the target cell 406 during handover. These communications may include the control information used by the UE 402 to detach from the source cell 404 and synchronize to the target cell 406 (e.g., a DL allocation from the source cell 404 as well as RRC connection reconfiguration control information-RRCConnectionReconfiguration with IE mobilityControlInfo to initiate the handover procedure), allocation and timing information transmitted by the target cell 406 to the UE 402, an acknowledgement from the UE 402 that the reconfiguration is complete prior to the UE sending data to the target cell 406. After the transmissions are completed, the communication link between the UE 402 and target cell 406 may be established and subsequently, the existing communication link between the UE 402 and the source cell 404 may be torn down. FIGS. 6A and 6B respectively illustrate IE mobilityControlInfo and mobilityControlInfoSCG ASN.1 code in accordance with some embodiments. In some embodiments, the IE mobilityControlInfo and mobilityControlInfoSCG ASN.1 code may be provided by the source and target cells 404, 406 shown in FIG. 4 or the cells 104 shown in FIG. 1 and the UE 402 shown in FIG. 4 or the UE 102 shown in FIG. 1. As shown in FIGS. 6A and 6B, the additional command information 602 and 604 may indicate to the UE 402 to skip various processes involved in handover. Specifically, if rach-Skip-r14 is signaled, the UE 402 may skip a RACH operation on the target cell 406; if layer2-ReconfigSkip-r14 is signaled, the UE 402 may not re-establish the PDCP, RLC, or MAC layer with the target cell 406; if keyUpdateSkip-r14 is signaled, the UE 402 may not perform a security key update. It should be also noted that similar signaling can be applicable for 5G systems.

Subsequently, the UE 402 may continue to send packet data 420 to the network at operation 516. In embodiments in which reconfiguration and security key signaling between the UE 402 and both the source cell 404 and the target cell 406 has been limited, the network may automatically determine from the information in the packet header of each packet sent by the UE 402 that the packet data 420 is from the UE 402. The network may route the packet data 420 automatically to the target cell 406 rather than the source cell 404.

If, however, at operation 508 the source cell 404 determines that the source cell 404 and target cell 406 are controlled by different entities or at operation 510 that an intra-frequency transition is to occur when the UE 402 is switched from the source cell 404 and target cell 406, at least some reconfiguration may occur at the UE 402 to enable the transition. Thus, the source cell 404 may transmit at least some of the handover commands to the UE 402 for reconfiguration. The information, however, and handover reconfiguration may be minimized.

For example, for handover between cells that are controlled by different entities, layer status/context may be transferred directly from the source cell 404 to the target cell 406 to reduce service interruption. Examples of handover between cells that are controlled by different entities is shown in scenarios C, D and E of FIG. 3. Currently, in an LTE Radio Link Control Acknowledgement Mode (AM) entity, some state variables may be maintained. For example, transmitter side of the AM entity may maintain certain counters, including PDU_WITHOUT_POLL, BYTE_WITHOUT_POLL, and RETX_COUNT. Similarly, the receiver end of the AM entity may maintain counters including VR(R), VR(MR), VR(X), VR(MS), and VR(H). In addition, transmitter side may maintain a transmission buffer while receiver side may maintain a reception buffer. The PDCP side may also maintain various layer 2 state variables and buffers. These layer 2 state variables and buffers, rather than being transmitted by the UE 402 to the target cell 406, may instead be exchanged directly from the source cell 404 to the target cell 406, e.g. via the X2 interface. To avoid unsynchronized status, the source cell 404 may stop transmission and reception to the UE 402 after initiating the layer 2 context transfer directly to the target cell 406, along with data buffered for the UE 402. This direct layer 2 state (and data) transfer may minimize the interruption time at UE side.

Figure 7:
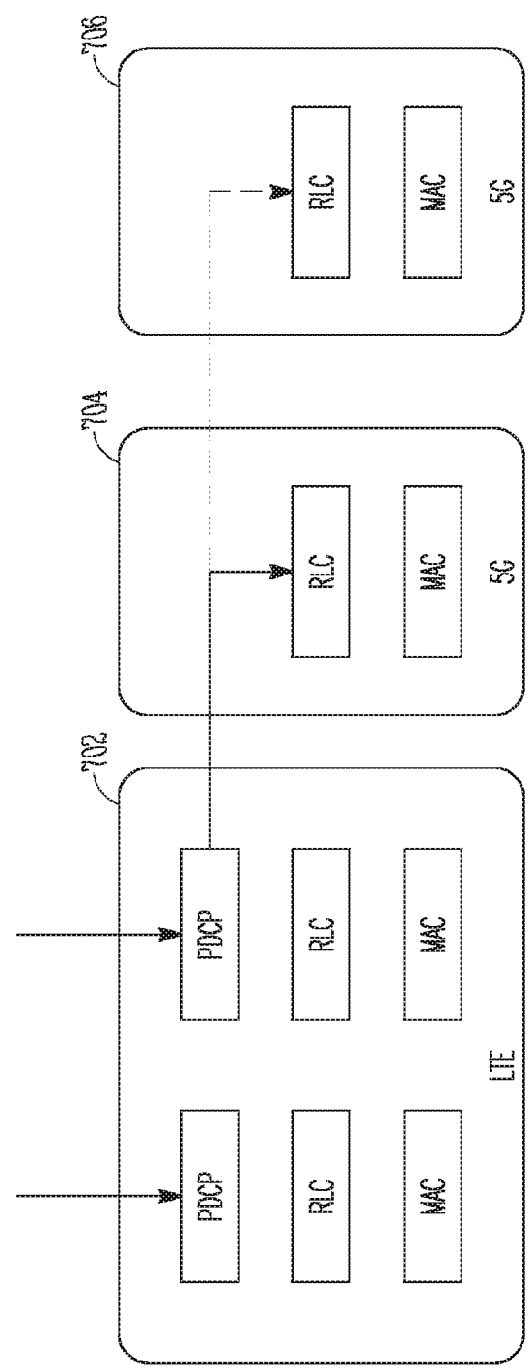
FIG. 7 illustrates Multiple Connectivity (MC) in accordance with some embodiments.

As shown in FIG. 3 and described above, the UE 402 may also use dual connectivity (DC), in which the UE 402 may connect only to a single SCG. In other Multiple Connectivity (MC) embodiments, the UE 402 may connect to two or more boosting cell groups (SeNBs). FIG. 7 illustrates Multiple Connectivity (MC) in accordance with some embodiments. As shown in FIG. 7, an LTE eNB 702 may be used as an anchor (i.e., a MeNB in LTE DC terminology), although in other embodiments a 5G eNB may be used as an anchor. In FIG. 7, a split bearer (also known as option 3C in LTE Rel-12 DC study) using two 5G eNBs 704, 706 is shown to aggregate anchor and booster eNBs. The LTE eNB 702 and 5G eNBs 704, 706 shown in FIG. 7 may be the source or target eNBs 404, 406 shown in FIG. 4 or the eNBs 104 shown in FIG. 1. In other embodiments, other protocol architecture options may be used for multiple connectivity scenarios. In some embodiments in which the UE is connected with a MeNB and a first SeNB, the UE may receive the reconfiguration message from either or both the MeNB and the first SeNB. The reconfiguration message may include an indication that the UE is to communicate with a second SeNB. The reconfiguration message may also indicate whether or not the UE is to avoid performing one or more of physical layer reconfiguration, layer 2 reconfiguration, or a security key update to the second SeNB. The UE may receive another reconfiguration message to release the first SeNB while the UE communicates with the MeNB, the first SeNB, and the second SeNB.

In MC or DC embodiments, to describe the signaling procedure, the target cell group may be added in a manner similar to the to procedure currently used to add a SeNB. Modification of the bearer settings may be avoided as current PDCP reordering for split bearer may also be able to handle multiple connectivity deployment. After the target cell group is added, both the source and target cell groups may be able to transmit simultaneously. Afterwards, the source cell group can be released. This may differ from the currently used handover procedures, in which the connection to the source cell groups may be torn down prior to the connection to the target cell groups being established. The PDCP layer of the UE in the embodiment shown in FIG. 7 may retransmit packets not successfully delivered. The UE can be configured to send a PDCP status report to the network so that duplicate retransmissions can be avoided. In the embodiment shown in FIG. 7, although there is reconfiguration involved (e.g., adding the target cell group and releasing the source cell group), the service interruption may be minimized by permitting the source and target cell group to communicate with the UE simultaneously during switching. Serving eNBs of different cell groups may work in the same or different frequencies.

Moreover, different models may be used to effect UE mobility. In particular, the coming 5G systems may be deployed using high frequency communications, e.g. millimeter wave (mmWave). However, unlike lower frequency LTE systems, with the jump in frequency use used by the high frequency systems, the channel conditions between the UE and the network may suddenly drop when transitioning between networks due to blockage from building, vehicles or other obstacles. In fact, in the 5G frequency spectrum, even human bodies may cause significant impediments to signal propagation. The determination of blockage may result from the UE or an eNB with which the UE is connected determining that a decrease in SNR or other QoS characteristic beyond a predetermined minimum threshold has occurred. To handle the effects of such blockages, the communication system may fall back on one or more of LTE link (i.e., attach to an LTE eNB) or another 5G link using lower frequency in which the characteristic rises above (or is expected to rise above upon retuning of the UE) the predetermined minimum threshold. As 5G systems are expected to use frequencies above 6 Hz, the lower frequencies may be up to about the 4-5 GHz range. In some embodiments, triggering of the fallback links may be based on a pull model, i.e., the UE may trigger the fallback. In some embodiments, triggering of the fallback links may be based on a push model, in which the network may trigger the fallback after detecting blockage issues.

For seamless mobility discussed above, it is may be possible to either use the push model or pull model to initiate the mobility procedure. For example, as described in FIG. 4, the network may decide to initiate handover, so that the push model is used. In other embodiments, the UE may decide to initiate handover, and initiate the handover procedure, thus using a pull model.

Various examples of the disclosure are provided below. These examples are not intended to in any way limit the disclosure herein. In Example 1, an apparatus of user equipment (UE) may comprise a transceiver arranged to communicate with a source enhanced NodeB (eNB) and a target eNB; and processing circuitry arranged to: configure the transceiver to receive a reconfiguration message comprising reconfiguration information comprising at least one parameter indicating that physical layer and layer 2 reconfiguration and a security key update is to be avoided during handover; and engage in handover from the source eNB to the target eNB free from physical layer and layer 2 reconfiguration and transmission of a security key to the target eNB, based on the reconfiguration message.

In Example 2, the subject matter of Example 1 can optionally include that the processing circuitry is further arranged to initiate handover from the source eNB to the target eNB based on reception of the reconfiguration message.

In Example 3, the subject matter of one or any combination of Examples 1-2 can optionally include that the reconfiguration information is dependent whether the source eNB and the target eNB are controlled by a same entity.

In Example 4, the subject matter of one or any combination of Examples 1-3 can optionally include that the reconfiguration information is dependent on whether the source eNB and the target eNB are configured to communicate with the UE using a same frequency.

In Example 5, the subject matter of one or any combination of Examples 1-4 can optionally include that the reconfiguration message comprises a single bit to indicate whether the physical layer and layer 2 of the UE is to be reconfigured and the security key is to be updated.

In Example 6, the subject matter of one or any combination of Examples 1-5 can optionally include that the reconfiguration message comprises a different bit to indicate each of whether the physical layer of the UE is to be reconfigured, the layer 2 of the UE is to be reconfigured and the security key is to be updated.

In Example 7, the subject matter of one or any combination of Examples 1-6 can optionally include that the UE is using dual connectivity in which the UE is attached to a master eNB (MeNB) and the source eNB and the target eNB are secondary eNBs (SeNBs), and the processing circuitry is further arranged to initiate handover from the source eNB to the target eNB based on the reconfiguration message while retaining connection to the MeNB such that the UE remains attached to the MeNB after switching between the SeNBs.

In Example 8, the subject matter of one or any combination of Examples 1-7 can optionally include that the UE is using dual connectivity in which the UE is attached to a master eNB (MeNB) and a secondary eNB (SeNB), and the processing circuitry is further arranged to initiate handover from between the master eNBs and between SeNBs based on the reconfiguration message.

In Example 9, the subject matter of one or any combination of Examples 1-8 can optionally include that the processing circuitry is further arranged to determine whether one or more signal quality characteristics in communications between the UE and the source eNB have met a predetermined minimum threshold; and initiate handover from the source eNB to the target eNB in response to determining that the signal quality characteristics have fallen below the predetermined minimum threshold based on the reconfiguration information from the reconfiguration message free from receiving a control message from the source eNB to initiate handover.

In Example 10, the subject matter of one or any combination of Examples 1-9 can optionally include that the source eNB is a first $5^{th}$ Generation (5G) eNB and the target eNB is one of a Long-Term Evolution (LTE) eNB and a second 5G eNB configured to communicate with the UE at a frequency lower than the first 5G eNB such that the signal quality characteristics of communications between the UE and the target eNB exceed the predetermined minimum threshold.

In Example 11, the subject matter of one or any combination of Examples 1-10 can optionally include that the processing circuitry is further arranged to: establish a connection to a master eNB (MeNB) and to a secondary eNB (SeNB) at the same time, the source eNB being a first SeNB and the target eNB being a second SeNB, configure the transceiver to receive the reconfiguration message from at least one of the MeNB and the first SeNB, the reconfiguration message comprising an indication that the UE is to communicate with the second SeNB, and configure the transceiver to receive another reconfiguration message to release the first SeNB while the UE is in communication with the MeNB, the first SeNB, and the second SeNB.

In Example 12, the subject matter of one or any combination of Examples 1-11 can optionally include that the processing circuitry is further arranged to configure the transceiver to establish a split bearer with the MeNB and at least one of the first and second SeNB.

In Example 13, the subject matter of one or any combination of Examples 1-12 can optionally include that the processing circuitry is further arranged to configure the transceiver to establish a connection with an anchor eNB prior to establishing connection with the source eNB, configure the transceiver to maintain a connection with the anchor eNB while the UE is connected with the source eNB and the target eNB, configure the transceiver to terminate the connection to the source eNB after being connected with the anchor eNB, the source eNB and the target eNB, and configure the transceiver to transmit a Packet Data Convergence Protocol (PDCP) report to the anchor eNB to avoid duplicate retransmissions by the PDCP layer of packets from the source eNB not successfully delivered to the UE prior to termination of the connection between the source eNB and the target eNB.

In Example 14, the subject matter of one or any combination of Examples 1-13 can optionally include an antenna configured to transmit and receive communications between the transceiver and at least one of the source and target eNB.

Example 15 may comprise an apparatus of an enhanced NodeB (eNB) comprising: a transceiver arranged to communicate with user equipment (UE); and processing circuitry arranged to: configure the transceiver to transmit measurement control signals to the UE; configure the transceiver to receive measurement feedback from the UE based on the measurement control signals; determine that handover of the UE is to occur based on the measurement feedback; generate a reconfiguration message comprising reconfiguration information comprising parameters for handover of the UE indicating that physical layer and layer 2 reconfigured and a security key update is to be avoided during the handover of the UE; and configure the transceiver to transmit the reconfiguration message to the UE.

In Example 16, the subject matter of Example 15 can optionally include that the processing circuitry is further arranged configure the transceiver to transmit layer 2 state variables and buffered data for the UE to the target eNB based on the determination that handover of the UE is to occur.

In Example 17, the subject matter of one or any combination of Examples 15-16 can optionally include that the processing circuitry is further arranged configure the transceiver to terminate transmission to and reception from the UE after transmission of the layer 2 state variables and buffered data to the target eNB such that the handover of the UE is from the eNB to the target eNB.

In Example 18, the subject matter of one or any combination of Examples 15-17 can optionally include that the reconfiguration information is dependent whether the eNB and the target eNB are controlled by a same entity.

In Example 19, the subject matter of one or any combination of Examples 15-18 can optionally include that the reconfiguration information is dependent whether the eNB and the target eNB are configured to communicate with the UE using a same frequency.

In Example 20, the subject matter of one or any combination of Examples 15-19 can optionally include that the reconfiguration message comprises a single bit to indicate whether the physical layer and layer 2 of the UE is to be reconfigured and the security key is to be updated.

In Example 21, the subject matter of one or any combination of Examples 15-20 can optionally include that the reconfiguration message comprises a different bit to indicate each of whether the physical layer of the UE is to be reconfigured, the layer 2 of the UE is to be reconfigured and the security key is to be updated.

In Example 22, the subject matter of one or any combination of Examples 15-21 can optionally include that the eNB is a master eNB (MeNB), and the processing circuitry is further arranged to configure the transceiver to maintain a connection to the UE while the UE is connected with both a source eNB and the target eNB such that the handover of the UE is from the source eNB to the target eNB, the source and target eNBs being secondary eNBs (SeNBs).

In Example 23, the subject matter of one or any combination of Examples 15-22 can optionally include that the eNB is a first 5$^{th}$ Generation (5G) eNB and the target eNB is one of a Long-Term Evolution (LTE) eNB and a second 5G eNB configured to communicate with the UE at a lower frequency than the first 5G eNB, and the measurement feedback indicates whether one or more signal quality characteristics associated with communication of the eNB with the UE have fallen below a predetermined minimum threshold, the frequency of the second 5G eNB sufficiently low such that the signal quality characteristics of communications between the UE and the second 5G eNB exceed the predetermined minimum threshold.

In Example 24, a non-transitory computer-readable storage medium that stores instructions for execution by one or more processors of a user equipment (UE) to configure the UE to communicate with an enhanced NodeB (eNB), the one or more processors to configure the UE to: transmit measurement feedback to the eNB based on measurement control signals from the eNB; receive a reconfiguration message comprising reconfiguration information indicating whether a physical layer and layer 2 of the UE is to be reconfigured and a security key is to be updated; and initiate handover from a source eNB to a target eNB free from physical layer and layer 2 reconfiguration to and a security key update to the target eNB after the reconfiguration message has been received.

In Example 25, the subject matter of Examples 24 can optionally include that the reconfiguration information is dependent on at least one of whether the handover is between eNBs controlled by a same entity and whether the handover comprises an intra-frequency transition.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A user equipment (UE) comprising:
   a transceiver arranged to communicate with a source cell and a target cell; and
   processing circuitry arranged to:
      configure the transceiver to receive a radio resource control (RRC) reconfiguration message comprising reconfiguration information including at least one indicator indicating whether to perform at least one of a physical layer reconfiguration, a layer 2 reconfiguration or a security key update during a handover;
      engage in the handover from the source cell to the target cell based at least on the reconfiguration information, including:
         performing the layer 2 reconfiguration when a first indicator indicates to perform the layer 2 reconfiguration, wherein the layer 2 reconfiguration comprises one or more of a packet data convergence protocol (PDCP) re-establishment or a radio link control (RLC) re-establishment;
         performing the security key update when a second indicator indicates to perform the security key update; or
         performing the physical layer reconfiguration when a third indicator indicates to perform the physical layer reconfiguration, the physical layer reconfiguration including a random access channel (RACH) operation on a target cell.

2. The UE of claim 1,
   wherein the reconfiguration information is dependent on whether the source cell and the target cell are controlled by a same entity.

3. The UE of claim 1,
wherein the RRC reconfiguration message comprises the first, second and third indicators.

4. The UE of claim 1,
wherein the UE is using dual connectivity in which the UE is attached to a master base station and the source cell and the target cell are secondary base stations, and
wherein the processing circuitry is further arranged to initiate the handover from a source base station to a target base station based on the RRC reconfiguration message while retaining connection to the master base station such that the UE remains attached to the master base station after switching between the secondary base stations.

5. The UE of claim 1, wherein the processing circuitry is further arranged to:
determine whether one or more signal quality characteristics in communications between the UE and the source cell have met a predetermined minimum threshold; and
initiate the handover from the source cell to the target cell in response to determining that the signal quality characteristics have fallen below the predetermined minimum threshold based on the reconfiguration information from the reconfiguration message free from receiving a control message from the source base station to initiate the handover.

6. The UE of claim 5,
wherein a source base station serving the source cell is a first 5th Generation (5G) base station and a target base station serving the target cell is one of a Long-Term Evolution (LTE) base station or a second 5G base station configured to communicate with the UE at a frequency lower than the first 5G base station such that the signal quality characteristics of communications between the UE and the target base station exceed the predetermined minimum threshold.

7. The UE of claim 1, wherein the processing circuitry is further arranged to:
establish a connection to a master base station and to a secondary base station at the same time, wherein the source cell is served by a first secondary base station and the target cell is served by a second secondary base station;
configure the transceiver to receive the RRC reconfiguration message from at least one of the master base station and the first secondary base station, the RRC reconfiguration message comprising an indication that the UE is to communicate with the second secondary base station; and
configure the transceiver to receive another RRC reconfiguration message to release the first secondary base station while the UE is in communication with the master base station, the first secondary base station, and the second secondary base station.

8. The UE of claim 7, wherein the processing circuitry is further arranged to:
configure the transceiver to establish a split bearer with the master base station and at least one of the first and second secondary base stations.

9. The UE of claim 1, wherein the processing circuitry is further arranged to:
configure the transceiver to transmit a Packet Data Convergence Protocol (PDCP) report to avoid duplicate retransmissions by the PDCP layer of packets from the target cell already received from the source cell.

10. A base station, comprising:
a transceiver arranged to communicate with a user equipment (UE); and
processing circuitry arranged to:
configure the transceiver to transmit measurement control signals to the UE;
configure the transceiver to receive measurement feedback from the UE based on the measurement control signals;
determine that a handover of the UE is to occur based on the measurement feedback;
generate a radio resource control (RRC) reconfiguration message comprising reconfiguration information comprising at least one parameter indicating whether to perform at least one of a physical layer reconfiguration, a layer 2 reconfiguration, or a security key update during the handover of the UE, wherein the RRC reconfiguration message causes the UE to engage in the handover from the source cell to the target cell without the at least one of the physical layer reconfiguration, the layer 2 reconfiguration and the security key update; and
configure the transceiver to transmit the RRC reconfiguration message to the UE.

11. The base station of claim 10, wherein the processing circuitry is further arranged to:
configure the transceiver to transmit layer 2 state variables and buffered data for the UE to a target cell based on the determination that the handover of the UE is to occur.

12. The base station of claim 11, wherein the processing circuitry is further arranged to:
configure the transceiver to terminate transmission to and reception from the UE after transmission of the layer 2 state variables and buffered data to the target cell such that the handover of the UE is from a source cell of the base station to the target cell.

13. The base station of claim 10,
wherein the reconfiguration information is dependent on whether the source cell and the target cell are controlled by a same entity.

14. The base station of claim 10,
wherein the reconfiguration information is dependent on whether the source cell and the target cell are configured to communicate with the UE using a same frequency.

15. The base station of claim 10,
wherein the reconfiguration information indicates whether to perform the physical layer configuration, the layer 2 reconfiguration, and the security key update during the handover of the UE.

16. A non-transitory computer-readable storage medium that stores instructions for execution by one or more processors of a user equipment (UE) to configure the UE to:
receive a radio resource control (RRC) reconfiguration message comprising reconfiguration information including at least one indicator indicating whether to perform at least one of a physical layer reconfiguration, a layer 2 reconfiguration or a security key update during a handover;
engage in the handover from a source cell to a target cell based at least on the reconfiguration information, including:
performing the layer 2 reconfiguration when a first indicator indicates to perform the layer 2 reconfiguration, wherein the layer 2 reconfiguration is one or more of a packet data convergence protocol (PDCP) re-establishment or a radio link control (RLC) re-establishment;

performing the security key update when a second indicator indicates to perform the security key update; or performing the physical layer reconfiguration when a third indicator indicates to perform the physical layer reconfiguration, the physical layer reconfiguration including a random access channel (RACH) operation on the target cell.

17. The base station of claim 10,
wherein the reconfiguration information comprises one or more of:
   a first indicator to indicate whether to perform layer 2 reconfiguration, wherein the layer 2 reconfiguration is one or more of a packet data convergence protocol (PDCP) re-establishment or a radio link control (RLC) re-establishment;
   a second indicator to indicate whether to perform a security key update; or
   a third indicator to indicate whether to perform a physical layer reconfiguration, the physical layer reconfiguration including random access channel (RACH) operation on a target cell of the target base station.

18. The UE of claim 1,
wherein the third indicator is a RACH-skip indicator indicating to not perform the RACH operation on the target cell.

19. The UE of claim 1,
wherein engaging in the handover from the source cell to the target cell further includes, based at least on the reconfiguration information, not performing one or more of the physical layer reconfiguration, the layer 2 reconfiguration, or the security key update.

20. The non-transitory computer-readable storage medium of claim 16,
wherein engaging in the handover from the source cell to the target cell further includes, based at least on the reconfiguration information, not performing one or more of the physical layer reconfiguration, the layer 2 reconfiguration, or the security key update.

* * * * *